US006508877B2

(12) United States Patent
Meisen

(10) Patent No.: US 6,508,877 B2
(45) Date of Patent: Jan. 21, 2003

(54) PROCESS FOR THE PRODUCTION OF AN ALUMINIUM-CONTAINING IRON OXIDE CRYSTALLIZATION NUCLEUS

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/945,181

(22) Filed: Aug. 31, 2001

(65) Prior Publication Data

US 2002/0050230 A1 May 2, 2002

(30) Foreign Application Priority Data

Sep. 7, 2000 (DE) ............................................ 10044095
Oct. 13, 2000 (DE) ............................................ 10050683

(51) Int. Cl.$^7$ ................................................ C09K 1/40
(52) U.S. Cl. ........................ 106/456; 106/404; 106/418; 106/439; 106/442; 106/474
(58) Field of Search .................................. 106/404, 418, 106/439, 442, 456, 474; 423/436

(56) References Cited

U.S. PATENT DOCUMENTS

| 4,618,375 A | * | 10/1986 | Patil et al. ................... 106/404 |
| 4,620,879 A | | 11/1986 | Burow et al. ............... 106/304 |
| 5,916,360 A | * | 6/1999 | Braun et al. ................. 106/456 |
| 6,042,642 A | * | 3/2000 | Braun et al. ................. 106/456 |
| 6,053,972 A | * | 4/2000 | Pitzer et al. ................. 106/456 |
| 6,179,908 B1 | * | 1/2001 | Braun et al. ................. 106/456 |

FOREIGN PATENT DOCUMENTS

| EP | 842901 | 5/1998 |
| EP | 982377 | 3/2000 |

* cited by examiner

Primary Examiner—Mark L. Bell
Assistant Examiner—Shalie Manlove
(74) Attorney, Agent, or Firm—Joseph C. Gil; Thomas W. Roy

(57) ABSTRACT

The present invention relates to a process for the production of an aluminum-containing iron oxide crystallization nucleus with a α-FeOOH crystal structure from $FeCl_2$. This nucleus is suitable as starting material for the production of iron oxide red (α-$Fe_2O_3$) via α-FeOOH as an intermediate product.

11 Claims, No Drawings

PROCESS FOR THE PRODUCTION OF AN ALUMINIUM-CONTAINING IRON OXIDE CRYSTALLIZATION NUCLEUS

BACKGROUND OF THE INVENTION

The present invention relates to a process for the production of an aluminum-containing iron oxide crystallization nucleus with an α-FeOOH crystal structure from $FeCl_2$. This nucleus is suitable as starting material for the production of iron oxide red ($\alpha$-$Fe_2O_3$) via α-FeOOH as intermediate product.

Synthetic iron oxides are normally produced by the Laux process, Penniman process, precipitation process, neutralization process or roasting process (Ullmann's Encyclopedia of Industrial Chemistry, $5^{th}$ Ed., 1992, Vol. A20, p. 297 ff). The iron oxides obtained in this way are generally used as pigments.

For the production of finely particulate α-FeOOH (needle width between 5 and 30 nm) two processes are known:
the so-called acid process and
the so-called alkaline process In the acid process an iron (II) component, such as an iron salt dissolved in water, is used as starting material and an alkaline component, such as an alkali or alkaline earth metal compound dissolved or suspended in water or also ammonia solution, is added thereto while mixing thoroughly. The amount of alkaline component that is added is generally between 15% and 70% of the stoichiometrically required amount. The pH after the addition of the alkaline component is in the weakly acidic range.

After completion of the addition of the alkaline component the reaction mixture is oxidized with an oxidizing agent, such as atmospheric oxygen. The reaction is carried out at temperatures between 20° C. and 50° C. At significantly higher temperatures there is the danger of the formation of undesirable magnetite. The end point of the reaction can be recognized by a sharp drop in pH and redox potential. After completion of the reaction the properties of the resultant product (generally termed crystallization nucleus) are determined and if appropriate the product is directly processed further into α-FeOOH pigment.

The alkaline process differs from the acid process by the amount of alkaline component that is added. In the alkaline process the amount of added component is at least 120% of the stoichiometrically necessary amount, and is usually significantly greater. The temperatures at which this reaction is carried out may be somewhat higher than the temperatures employed in the acid process, since the danger of the formation of magnetite is not as high in this case.

In the alkaline process relatively long needle-shaped α-FeOOH crystallites are usually obtained with a length to width ratio of 10:1 to 30:1. Since these crystallites furthermore have a very low dendrite content this process is particularly suitable for the production of α-FeOOH as starting product for magnetic tapes.

For the production of α-FeOOH pigments for use in paints and lacquers, the crystallization nuclei produced by the alkaline process cannot be used directly or can only be used to a limited extent since in this process all chromophoric metals present in the Fe component are incorporated. These metals (in particular Mn, Cr, Cu, Ni) significantly impair the color properties and thus restrict the use of crystallization nuclei produced in this way as color pigments.

In order to produce iron oxide yellow pigments an α-FeOOH crystallization nucleus is preferably used and this is then coarsened (built up) in the acid, as a result of which the incorporation of the chromophoric metals is reduced. If it is desired to produce a particularly color-pure iron oxide red ($\alpha$-$Fe_2O_3$) from α-FeOOH by calcination, the α-FeOOH serving as starting material should contain only minor amounts of chromophoric metals. Furthermore, the build-up may take place only at a pH of less than ca. 4 since at higher pH values the chromophoric metals are incorporated in increasing amounts. In addition the particle shape of the α-FeOOH considerably affects the color properties, the viscosity of the coating composition and the need for binders.

In order to achieve a desirable low viscosity in the coating composition and a low binder requirement, short-needle α-FeOOH particles are necessary. These may be produced from long-needle α-FeOOH particles by intensive grinding. A more cost-effective alternative is to produce short-needle α-FeOOH particles directly.

In order to control the particle shape of the α-FeOOH crystallization nucleus and thus the shape of the pigment built up therefrom, so as to obtain a low length to width ratio, modifying additives are necessary. The use of B, Al, Ga, Si, Ge, Sn or Pb as crystallization nucleus modifiers is known from U.S. Pat. No. 4,620,879. This patent specification describes an iron oxide yellow with a particularly low silking index, which is achieved by an appropriate procedure for the pigment build-up and by adding the aforementioned modifiers. However, this patent specification does not state how to prepare an α-FeOOH crystallization nucleus for the production of a particularly good (color-pure) $\alpha$-$Fe_2O_3$ pigment.

An object of the present invention is to provide a process for the simple and inexpensive production of a short-needle α-FeOOH crystallization nucleus according to the precipitation process. This α-FeOOH crystallization nucleus should allow the formation of an (α-FeOOH pigment. From this subsequently isolated α-FeOOH pigment an $\alpha$-$Fe_2O_3$ red pigment should be finally produced by annealing.

This object is achieved by the process according to the invention. If iron (II) chloride is used instead of iron (II) sulfate and 3 to 16 mole % of aluminum, based on Fe is added thereto, then a very finely particulate α-FeOOH with an aspect ratio of 2100 to 3100 is obtained. In the present context the aspect ratio denotes the mathematical product of the BET surface and mean crystallite size that has been determined by X-ray analysis of the 110 reflection of the α-FeOOH.

SUMMARY OF THE INVENTION

The invention relates to a process for the production of aluminum-containing iron oxide crystallization nuclei having an α-FeOOH crystal structure with an aspect ratio of 2100 to 3100 by using $FeCl_2$, containing the steps of
a) initially adding an Al component, while stirring, in amounts of 6 to 20 mole % based on total Fe, to an iron II chloride solution with a total Fe content of 20–100 g/l, preferably 40–65 g/l, and a Fe III content of 0.1–10 mole % Fe III (based on total Fe),
b) heating this mixture to a precipitation temperature between 30° C. and 60° C., preferably between 35 and 50° C.,
c) adding a precipitating agent with an active constituent content of 2–10 equivalents per liter, preferably 4–8 equivalents per liter, to the mixture, and the molar ratio Fe+Al to precipitating agent is 20%–80% of the stoichiometric amount, preferably 30% to 60% of the stoichiometric amount, d) then oxidizing the precipitated suspension with an oxidizing agent at an oxidation rate of 2–50 mole %/hr. of the iron to be oxidized.

The Al-containing α-FeOOH crystallization nucleus obtained after the oxidization may if desired be used without further isolation, after checking the properties, for the production of iron oxide red pigments via α-FeOOH as intermediate.

DETAILED DESCRITION OF THE INVENTION

The following procedure is preferably employed:
Starting chemicals:
  FeCl$_2$ solution with an Fe content of 55 g/l Fe, of which 1.5 mole % is Fe III
  AlCl$_3$ solution
  NaOH solution with an NaOH content of 300 g/l=7.5 equivalents NaOH/l
  Al/Fe ratio: 12–13
  Ratio Fe+Al/precipitating agent: 30–40%
Reaction conditions:
  Temperature: 34° C.
  Oxidation rate: 30–35 mole % Fe II/hr.

AlCl$_3$ (as aqueous solution) is preferably used as Al component. The use of Si or Ti in the form of their chlorides as crystallization nucleus modifier is also possible, but involves a greater technical expenditure in the production.

Suitable precipitating agents include NaOH, KOH, Na$_2$CO$_3$, K$_2$CO$_3$, Mg(OH)$_2$, MgO, MgCO$_3$, Ca(OH)$_2$, CaO, CaCO$_3$, NH$_3$ or secondary or tertiary aliphatic amines in aqueous solution or as an aqueous slurry. Preferably, NaOH is employed.

Suitable oxidizing agents include atmospheric oxygen, oxygen, ozone, H$_2$O$_2$, chlorine, nitrates of the alkali or alkaline earth metals or NH$_4$NO$_3$. Atmospheric oxygen is preferred.

If the iron II chloride solution that is used contains relatively large amounts, at pH values of less than 4, of chromophoric metals that can be precipitated, then these can be precipitated up to pH 4 by adding an alkaline component to the iron II chloride solution. The solid that is formed can be removed by sedimentation, filtration or centrifugation from the supernatant clear purified solution. In addition to the undesired chromophoric metals, Fe III, which has a significant undesirable influence (formation of black magnetite) on the reaction to form the α-FeOOH crystallization nucleus, is also thereby removed.

The reaction can be carried out batchwise or continuously in stirred vessels, in cascades of stirred vessels, in recycle reactors or in stirrer-less reactors using twin-feed nozzles as mixing devices.

After production of the α-FeOOH crystallization nuclei according to the invention the latter are converted into a pigment, which is effected by a coarsening of the nuclei particles known per se (pigment build-up). Since the α-FeOOH crystallization nuclei according to the invention are however not used as such, it is necessary to describe the pigment build-up and the annealing to form an iron oxide red pigment.

The Al-containing crystallization nucleus produced by the process according to the invention is pumped into a solution of FeCl$_2$ or FeSO$_4$ or another Fe II salt. In this connection, 7–15 moles of Fe II salt in the form of a solution with an Fe content of 30–100 g/l Fe are added per 1 mole of FeOOH in the crystallization nucleus. This suspension is now heated to the reaction temperature, which is between 50° C. and 90° C. Oxidation and precipitation start simultaneously after the precipitation temperature is reached. As a rule atmospheric oxygen is added via a suitable gassing device and the pH of the suspension is regulated with an alkaline precipitating agent. The pH value is regulated in the range from 2.4 to 4.8. The oxidation rate should be between 0.5 and 8 mole % Fe III/hr.

The most preferred final products are obtained if the following parameters are adjusted during the formation of the pigment:
  Ratio α-FeOOH (crystallization nuclei): FeCl$_2$=1:10
  Temperature: 60° C.
  Final pH (reaction): 3,4
  Oxidation velocity: 4 mol % Fe/h
  Fe-content of the FeCl$_2$: 90–100 g/l After completion of the reaction (i.e. when all Fe (II) is oxidized) the solid that is formed is separated by filtration. The solid is washed salt-free and can then be dried. Since according to another aspect of the invention an α-Fe$_2$O$_3$ red pigment is to be produced from this α-FeOOH, it is expedient to pass the washed solid directly to a suitable annealing unit.

The annealing of the α-FeOOH pigment conveniently takes place in a continuously operating apparatus. Revolving tubular furnaces, continuous shaft furnaces, fluidized bed reactors, falling shaft furnaces and continuous reheating furnaces are suitable for this purpose. The necessary annealing temperatures (measured in the product) are only between 550° C. and 800° C. The necessary mean residence times are between 10 and 80 minutes. The α-Fe$_2$O$_3$ pigment that is formed is then preferably subjected to a screening grinding in order to remove oversized material and agglomerates.

The best results are obtained at annealing temperatures of 700° C.–800° C. at a dwell of 30–60 minutes.

The red pigment that is thus obtained is characterized by a high color purity, virtually isometric particle shape, low oil absorption index and high chemical purity. On account of the sum total of its properties the pigment is particularly suitable for:
  use in the paints and lacquers sector
  uses as raw material for catalysts
  uses in the foodstuffs colorant sector
  uses in the paper printing ink sector
  uses in the polymer colorant sector
  uses as UV stabilizers
  uses in the high-quality building materials sector (plaster, etc.)
  uses in the dispersion paints sector This process is particularly economical with respect to the relatively low annealing temperatures, inexpensive raw materials and the high production rate in gel pigment production. Because of the particular reaction conditions and the use of a strictly specified crystallization nucleus it is possible to reliably produce particularly high-quality red pigments that have application technology advantages compared to pigments produced by other methods. Environmentally harmful chemicals are not employed in the production according to the invention of the red pigments.

In a preferred production procedure (use of FeCl$_2$, AlCl$_3$, NaOH and air as starting substances) an almost closed substance circulation is possible by electrolysis of the NaCl formed as byproduct. The sodium hydroxide solution obtained thereby may be directly reused in the process.

The products H$_2$ and Cl$_2$ formed in the alkali chloride electrolysis may be converted into HCl, which in turn then serves for the pickling of steel sheet material. It is not possible at the present time to use this particularly environmentally friendly technology with FeSO$_4$ since the electrolysis of the Na$_2$SO$_4$ does not proceed satisfactorily.

Description of the employed measurement methods

1. Measurement of the BET surface

The BET surface is determined by the so-called 1-point method according to DIN 66131. 90% He and 10% N$_2$ is used as gas mixture, and the measurement is carried out at 77.4 K. Before the measurement the sample is heated for 60 minutes at 140° C.

2. X-ray measurement of the crystallite size

The crystallite size is measured in a Philips powder diffractometer.

The 110 reflection is used to determine the crystallite size. α-iron oxide hydroxide (M(FeOOH)=88.9 g/mole 2.1 Application range Determination of the crystallite size in goethite in the range from 5 to 100 nm 2.2 Principle The measurement in goethite is made after X-ray diffractometric irradiation by detecting the reflection. The evaluation is made using silicon as external standard.

2.3 Reagents

Silicon standard for angular calibration (ICDD-No. 27-1402). Philips PW 1062/20

2.4 Equipment 2.4.1 Diffractometer:Philips PW 1800 goniometer Type: Theta-2 Theta 2.4.2 Sample feed:21 x sample exchanger 2.4.3 Detector: Xe proportional counter tube 2.4.4 Reflection evaluation: X-Pert Software Rev. 1.2 on HP Vectra VL 2.4.5 Mortar and pestle from Achat 2.4.6 Sample carrier: Philips PW 1811/00 and PW 1811/27

2.5 X-ray diffractometry conditions 2.5.1 X-ray tube: long fine focus, Cu anode, 60 kV, 2200 W 2.5.2 Radiation: CuKα$_1$, λ=0.154056 nm 2.5.3 Generator: 40 kV, 40 mA 2.5.4 Scan parameters:

2.5.4.1 Scan type: Step Scan 2.5.4.2 Step size: 0.020° 2Theta 2.5.4.3 Step measurement time: 2.00 sec.

2.5.5 Silicon standard:

2.5.5.1 Starting angle: 27.00° 2Theta 2.5.5.2 Final angle: 30.00° 2Theta 2.5.6 Sample:

2.5.6.1 Starting angle: 18.50° 2Theta 2.5.6.2 Final angle: 23.50° 2Theta 2.6 Execution 2.6.1 External standard:

2.6.1.1 Insert the silicon standard (2.1) in the sample carrier of the diffractometer and start the measurement program.

2.6.1.2 Measure the maximum and the half width of the silicon reflection with the Miller indices hkl=111 in the 2Theta angular range 27.00° to 30.00°. Print out the peak parameters (Table 1) and optionally the diffractogram.

2.6.2 Measurement in the sample:

2.6.2.1 Grind about 2 g of sample in the Achat mortar (4.5).

2.6.2.2 Add about 1 g of sample to the sample carrier (4.6) of the diffractometer and start the measurement program.

2.6.2.3 Measure the maximum and the integral width of the goethite reflection with the Miller indices hkl=110 in the 2Theta angular range 18.50° to 23.50°. Print out the peak parameters (Table 2) and if necessary the diffractogram.

2.7 Calculations 2.7.1 Enter the integral width (width of broadened profile), the maximum (peak position/° 2Theta) of the goethite reflection as well as the reflection half width (width of standard profile/FWHM) of the silicon standard in the crystallite size measurement table displayed by the computer (X'Pert software, Rev. 1.2 (Philips Analytical GmbH, Kassel, DE) profile widths). Prepare and print out the evaluation protocol (Table 2).

2.7.2 The crystallite size in the X'Pert program is determined according to the Scherrer equation, $$D_{(crystallite\ size)} \frac{k \cdot \lambda}{W_{size} \cdot \cos\theta}$$

$D_{(crystallite\ size)}$ Crystallite size in nm
   k Form factor of the crystallites=0.9 (mean value from the literature)
   λ Wavelength in mm
   $W_{size}$ Integral width of the goethite reflection— reflection half width of the silicon standard
   cosθ Maximum of the goethite reflection in °2Theta

TABLE 1

Peak parameters of the silicon reflection

| Parameter | | |
|---|---|---|
| Signal position, maximum value [position (° 2 Theta] | | 0028.45746 |
| Net signal height [net height (counts)] | | 8588.32 |
| Background height at signal position | | |
| [background height at peak position (counts)] | | 66.56 |
| Net area [net area (° 2 Theta * counts)] | | 1182 |
| Background area [background area (° 2 Theta * counts)] | | 200 |
| Signal heights half width [FWHM (° 2 Theta)] | | 0.0976 |
| Integral width [integral width (° 2 Theta)] | | 0.1376 |
| Signal heights half width/integral width [FWHM/integral width] | | 0.7094 |
| Asymmetry factor | | 0.99 |
| Background | | |
| Starting angle [low angle side] | (° 2 Theta) | 27.02000 |
| | (counts) | 61.58 |
| Final angle [high angle side] | (° 2 Theta) | 29.98000 |
| | (counts) | 71.75 |

TABLE 2

Peak Parameters of the goethite sample: crystallite size 46.5 nm

| | |
|---|---|
| Signal position, maximum value [position (° 2 Theta)] | 21.25219 |
| Net signal height [net height (counts)] | 2120.73 |
| Background height at signal position | 44.92 |
| [background height at peak position (counts)] | |
| Net area [net area (° 2 Theta * counts)] | 589 |
| Background area [background area (° 2 Theta * counts)] | 237 |
| Signal heights half width [FWHM (° 2 Theta)] | 0.2061 |
| Integral width [integral width (° 2 Theta)] | 0.2779 |
| Signal heights half width/integral width [FWHM/integral width] | 0.7415 |
| Asymmetry factor | 1.16 |

TABLE 2-continued

Peak Parameters of the goethite sample: crystallite size 46.5 nm

Background

| Starting angle [low angle side] | (° 2 Theta) | 18.54000 |
|---|---|---|
| | (counts) | 58.38 |
| Final angle [high angle side] | (° 2 Theta) | 23.67000 |
| | (counts) | 33.05 | been precipitated by the NaOH was taken into account. The Fe III fraction was calculated as Fe II. It was furthermore assumed that Fe and Al are precipitated uniformly.)

The crystallization nucleus that was obtained had the following properties:

| BET surface: | 173 m²/g |
|---|---|
| Crystallite size: | 17.5 nm |
| AV: | 3027 |

TABLE 3

Crystallite size determination via X'Pert program: Scherrer equation
Menu point: addition functions in the X'Pert program part: X'Pert Organiser

| Anode material | Cu (copper) |
|---|---|
| Radiation type | Cu Kα |
| Wavelength (nm) | 0.154184 |
| K factor (form factor - mean value) | 0.9000 |
| Intensity ratio Cu Kα$_1$/Cu Kα$_2$ | 0.5000 |

| Signal Width of the Broadening (° 2 Theta) | Signal Width (° 2 Theta) | Grain Size Broadening (° 2 Theta) | Grid Potential Broadening (° 2 Theta) | Signal Position (° 2 Theta) | Crystallite Size (nm) |
|---|---|---|---|---|---|
| 0.1376 | 0.0976 | 0.0400 | 0.0970 | 28.45500 | 205.1 |
| 0.2779 | 0.0976 | 0.1803 | 0.2602 | 21.25400 | 44.9 |
| 0.2766 | 0.0976 | 0.1790 | 0.2588 | 21.25100 | 45.2 |
| 0.8814 | 0.0976 | 0.7838 | 0.8760 | 21.22800 | 10.3 |
| 0.9325 | 0.0976 | 0.8349 | 0.9274 | 21.24400 | 9.7 |
| 0.4287 | 0.0976 | 0.3311 | 0.4174 | 21.22090 | 24.4 |
| 0.4274 | 0.0976 | 0.3298 | 0.4161 | 21.21911 | 24.5 |

3. Measurement of the color values

The color values are measured as described in EP-A 0 911 370.

EXAMPLES

Example 1

Aluminum-containing Crystallization Nucleus from FeCl$_2$ and AlCl$_3$ 14.095 l of FeCl$_2$ solution containing 55.07 g/l of Fe and an Fe III content of 1.5 mole % (referred to total Fe) were added to a batchwise-operating stirred vessel of 30 liters effective volume equipped with a 3-stage cross-blade agitator and a gassing device (perforated ring located underneath the stirrer). 914 g of AlCl$_3$ solution containing 5.06 wt. % of Al and 3.95 wt. % of HCl were then added.

The FeCl$_2$ amount corresponded to 13.9 moles Fe (Fe II and Fe III), the AlCl$_3$ amount to 1.71 moles, and the HCl amount to 0.98 mole. The ratio of Al to total Fe accordingly corresponded to 12.3 mole % referred to total Fe. This solution was heated to 34° C. while stirring and gassing with 300 Nl/hr. of nitrogen. When this temperature had been reached 1615 ml of sodium hydroxide solution containing 300 g of NaOH/l (corresponding to 7.5 equivalents per liter) were pumped in within 6 minutes using a gear-type pump. 33.8% of the metals Fe+Al were accordingly precipitated. Immediately after the completion of the precipitation the gassing with nitrogen was discontinued, and the mixture was gassed with 97 Nl/hr. of air in order to effect oxidation. The reaction was complete 180 minutes after the start of the oxidation. The oxidation rate was accordingly 33.3 mole % Fe II/hr. (In this connection only 33.8% of the Fe that had Example 2

Aluminum-containing Crystallization Nucleus from FeCl2/and AlCl$_3$ 11.58 l of FeCl$_2$ solution containing 55.09 g/l of Fe and an Fe III content of 1.0 mole % (referred to total Fe) were added to a batchwise-operating stirred vessel of 30 liters effective volume equipped with a 3-stage cross-blade agitator and a gassing device (perforated ring located underneath the stirrer). 818 g of AlCl$_3$ solution containing 6.00 wt. % of Al and 1.6 wt. % of HCl were then added.

The FeCl$_2$ amount corresponded to 9.5 moles Fe (Fe II and Fe III), the AlCl$_3$ amount to 1.82 moles, and the HCl amount to 0.36 mole. The Al/total Fe ratio accordingly corresponded to 19.2 mole % referred to total Fe. This solution was heated to 44° C. while stirring and gassing with 300 Nl/hr. of nitrogen. When this temperature had been reached 1061 ml of sodium hydroxide solution containing 300 g of NaOH/l (corresponding to 7.5 equivalents per liter) were pumped in within 10 minutes using a gear-type pump. 32.1% of the metals Fe+Al were then precipitated by the NaOH. Immediately after completion of the precipitation the gassing with nitrogen was discontinued, and the mixture was gassed with 67 Nl/hr. of air. The reaction was complete 135 minutes after the start of the oxidation. The oxidation rate was accordingly 44.5 mole % Fe II/hr. (In this connection only 32.1% of the Fe that had been precipitated by the NaOH was taken into account. The Fe III fraction was calculated as Fe II. It was furthermore assumed that Fe and Al are precipitated uniformly.)

The crystallization nucleus had the following properties:

| | |
|---|---|
| BET surface: | 186 m²/g |
| Crystallite size: | 15.5 nm |
| AV: | 2883 |

Example 3

Aluminum-containing Crystallization Nucleus from FeCl₂ and AlCl₃

14.095 l of FeCl₂ solution containing 55.07 g/l of Fe and an Fe III content of 1.5 mole % (referred to total Fe) were added to a batchwise-operating stirred vessel of 30 liters effective volume equipped with a 3-stage cross-blade agitator and a gassing device (perforated ring located underneath the stirrer). 914 g of AlCl₃ solution containing 5.06 wt. % of Al and 3.95 wt. % of HCl were then added.

The FeCl₂ amount corresponded to 13.9 moles Fe (Fe II and Fe III), the AlCl₃ amount to 1.71 moles, and the HCl amount to 0.989 mole. The ratio of Al to total Fe accordingly corresponded to 12.3 mole % referred to total Fe. This solution was heated to 44° C. while stirring and gassing with 300 Nl/hr. of nitrogen. When this temperature had been reached 1615 ml of sodium hydroxide solution containing 300 g of NaOH/l (corresponding to 7.5 equivalents per liter) were pumped in within 6 minutes using a gear-type pump. 33.8% of the metals Fe+Al were accordingly precipitated by the NaOH. Immediately after completion of the precipitation the gassing with nitrogen was discontinued, and the mixture was gassed with 97 Nl/hr. of air. The reaction was complete 180 minutes after the start of the oxidation. The oxidation rate was accordingly 33.3 mole % Fe II/hr. (In this connection only 33.8% of the Fe that had been precipitated by the NaOH was taken into account. The Fe III fraction was calculated as Fe II. It was furthermore assumed that Fe and Al are precipitated uniformly.)

The crystallization nucleus had the following properties:

| | |
|---|---|
| BET surface: | 100 m²/g |
| Crystallite size: | 27.0 nm |
| AV: | 2700 |

Example 4

Yellow Pigment Production 2 moles of yellow crystallization nucleus suspension from Example 1 (calculated as moles of α-FeOOH) and 20 moles of FeCl₂ with an Fe content of 95.7 g/l of Fe were added to a batchwise-operating stirred vessel equipped with a gassing ring, pH measurement device, temperature regulation device and a 3-stage cross-blade agitator. This suspension was heated to 60° C. while stirring continuously. After this temperature had been reached a pH of 3.4 was maintained by constantly metering in sodium hydroxide solution containing 300 g/l of NaOH. The solution was simultaneously gassed with 40 ml/hr. of air. After 1453 minutes gassing time all the Fe II was oxidized, corresponding to an oxidation rate of 4.1 mole % Fe/hr.

The yellow pigment obtained had the following properties:

| | |
|---|---|
| BET surface: | 32.7 m²/g |
| Crystallite size: | 32 nm |
| Color strength (against Bayferrox 915): | 101% |
| da*: | −0.9 |
| db*: | −2.1 |
| dL* (against Bayferrox 915): | −2.4 |
| da*: | −1.0 |
| db*: | −4.0 |

Example 5

Yellow Pigment Production

Instead of the crystallization nucleus from Example 1, the nucleus from Example 2 was used and the amount of air was adjusted to 76 Nl/hr. Under otherwise identical reaction conditions a yellow pigment with the following properties was obtained after 1618 minutes (oxidation rate 3.7 mole %/hr.):

| | |
|---|---|
| BET surface: | 45.6 m²/g |
| Crystallite size: | 25 nm |
| Color strength (against Bayferrox 915): | 97% |
| da*: | 0.1 |
| db*: | −2.6 |
| dL* (against Bayferrox 915): | −3.4 |
| da*: | 1.1 |
| db*: | −4.0 |

Example 6

Yellow Pigment Production

Instead of the crystallization nucleus from Example 1, the nucleus from Example 3 was used. The following yellow pigment was obtained under the reaction conditions of Example 5:

| | |
|---|---|
| BET surface: | 22.0 m²/g |
| Crystallite size: | 27 nm |
| Color strength (against Bayferrox 915): | 97% |
| da*: | 0.2 |
| db*: | −1.2 |
| dL* (against Bayferrox 915): | −0.7 |
| da*: | 0.7 |
| db*: | −1.2 |

Examples 7–12

Red Annealings

Measured Against Bayferrox 110M, L64

| Example No. | Pigment No. | Temp. [° C.] | dL* | da* | db* | FS [%] | da* | db* |
|---|---|---|---|---|---|---|---|---|
| 7 | 4 | 700 | 1.8 | 1.7 | 2.2 | 99 | 2.1 | 3.9 |
| 8 | 4 | 700 | 1.5 | 2.2 | 1.5 | 105 | 1.7 | 1.0 |
| 9 | 5 | 700 | 2.5 | −0.4 | 3.0 | 87 | 1.5 | 7.4 |

-continued

| Example No. | Pigment No. | Temp. [° C.] | dL* | da* | db* | FS [%] | da* | db* |
|---|---|---|---|---|---|---|---|---|
| 10 | 5 | 750 | 2.5 | 0.9 | 3.3 | 94 | 1.6 | 4.9 |
| 11 | 6 | 700 | 0.2 | 1.5 | −0.6 | 111 | 0.4 | −1.9 |
| 12 | 6 | 750 | −0.1 | 1.4 | −1.4 | 112 | −0.3 | −4.0 |

All annealings were carried out in a laboratory chamber furnace at the specified temperatures. The amount of product was 50 g, the packing height was 40 mm, and the annealing time was 30 minutes at the specified temperature.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of aluminum-containing iron oxide crystallization nuclei having an α-FeOOH crystal structure with an aspect ratio of 2100 to 3100 by using $FeCl_2$, comprising the steps of
    a) initially adding an Al component, while stirring, in amounts of 6 to 20 mole % based on total Fe, to an iron II chloride solution with a total Fe content of 20–100 g/l, and a Fe III content of 0.1–10 mole % Fe III (based on total Fe),
    b) heating this mixture to a precipitation temperature between 30° C. and 60° C.,
    c) adding a precipitating agent with an active constituent content of 2–10 equivalents per liter to the mixture, and the molar ratio Fe+Al to precipitating agent is 20%–80% of the stoichiometric amount,
    d) then oxidizing the precipitated suspension with an oxidizing agent at an oxidation rate of 2–50 mole %/hr. of the iron to be oxidized.

2. The process of claim 1, wherein a) the total Fe content is 40–65g/l.

3. The process of claim 1, wherein b) the temperature is between 35° and 50° C.

4. The process of claim 1, wherein c) the molar ratio Fe+Al to precipitating agent is 30%–60% of the stoichiometric amount.

5. The process of claim 1, wherein aluminum chloride is used as Al component.

6. The process of claim 1, wherein NaOH, KOH, $Na_2CO_3$, $K_2CO_3$, $Mg(OH)_2$, MgO, $MgCO_3$, $Ca(OH)_2$, CaO, $CaCO_3$, $NH_3$ or secondary or tertiary aliphatic amines in aqueous solution or aqueous slurry are used as precipitating agent.

7. The process of claim 1, wherein atmospheric oxygen, oxygen, ozone, $H_2O_2$, chlorine, nitrates of alkali or alkaline earth metals or $NH_4NO_3$ are used as oxidizing agent.

8. The process of claim 1, wherein the reaction is carried out in batchwise-operating or continuous stirred vessels, cascades of stirred vessels, recycle reactors or stirrer-less reactors with two-component nozzles as mixing devices.

9. A process for the production of α-$Fe_2O_3$ comprising the steps of
    i) making an α-FeOOH crystallization nuclei with an aspect ratio of 2100 to 3100 by using $FeCl_2$, comprising the steps of
        a) initially adding an Al component, while stirring, in amounts of 6 to 20 mole % based on total Fe, to an iron II chloride solution with a total Fe content of 20–100 g/l, and a Fe III content of 0.1–10 mole % Fe III (based on total Fe),
        b) heating this mixture to a precipitation temperature between 30° C. and 60° C.,
        c) adding a precipitating agent with an active constituent content of 2–10 equivalents per liter to the mixture, and the molar ratio Fe+Al to precipitating agent is 20%–80% of the stoichiometric amount,
        d) then oxidizing the precipitated suspension with an oxidizing agent at an oxidation rate of 2–50 mole %/hr. of the iron to be oxidized, and
    ii) without further isolation producing an iron oxide red pigments via α-FeOOH as intermediate.

10. A process according to claim 1, wherein said active constituent of said precipitating agent is 4–8 equivalents per liter.

11. A process according to claim 9, wherein said active constituent of said precipitating agent is 4–8 equivalents per liter.

* * * * *